United States Patent
Kawasumi et al.

(10) Patent No.: US 7,451,533 B2
(45) Date of Patent: Nov. 18, 2008

(54) NC AUTOMATIC LATHE (75) Inventors: Masahiro Kawasumi, Shizuoka (JP); Satoru Ozawa, Shizuoka (JP); Naomi Aono, Shizuoka (JP)

(73) Assignee: Star Micronics Co., Ltd., Shizuoka (JP)

( * ) Notice: Subject to any disclaimer, the term of this patent is extended or adjusted under 35 U.S.C. 154(b) by 236 days.

(21) Appl. No.: 10/575,068

(22) PCT Filed: Oct. 4, 2004

(86) PCT No.: PCT/JP2004/014581

§ 371 (c)(1),
(2), (4) Date: Apr. 7, 2006

(87) PCT Pub. No.: WO2005/035172

PCT Pub. Date: Apr. 21, 2005

(65) Prior Publication Data

US 2007/0068350 A1 Mar. 29, 2007

(30) Foreign Application Priority Data

Oct. 9, 2003 (JP) ............................. 2003-351367

(51) Int. Cl.
*B23B 27/00* (2006.01)
*B23B 3/00* (2006.01)
(52) U.S. Cl. ....................................... 29/27 C; 82/118
(58) Field of Classification Search ................ 29/27 C, 29/27 R, 27 A, 28, 36, 39; 82/117, 118, 120, 82/121, 129; 483/16
See application file for complete search history.

(56) References Cited

U.S. PATENT DOCUMENTS 5,127,140 A * 7/1992 Oiwa et al. ................. 29/27 C (Continued)

FOREIGN PATENT DOCUMENTS

JP 6-703 1/1994

(Continued)

OTHER PUBLICATIONS

International Search Report for PCT/JP2004/014581 dated Dec. 28, 2004 (2 pages).

*Primary Examiner*—Dana Ross
(74) *Attorney, Agent, or Firm*—Osha · Liang LLP (57) ABSTRACT An NC automatic lathe including abase board, a headstock provided with a main spindle and so arranged as to move in a direction of Z1 axis, a back attachment provided with a sub spindle which is so arranged as to be opposed to the headstock, the back attachment being so arranged as to move in directions of Z2 axis, X2 axis and Y2 axis, a guide bush, a first turret tool post arranged at a side of the guide bush so as to move in directions of X1 axis and Y1 axis, a second turret tool post arranged at a side of the guide bush so as to move in directions of Z3 axis, X3 axis and Y3 axis, and a fixed back machining tool unit arranged at a position offset with respect to at least one of the first turret tool post and second turret tool post, to the back attachment in a direction of Z axis, and provided with tool holding portions in at least two rows and two lines in directions of X axis and Y axis.

3 Claims, 7 Drawing Sheets

U.S. PATENT DOCUMENTS

| | | | |
|---|---|---|---|
| 5,152,201 A * | 10/1992 | Izawa | 82/1.11 |
| 6,626,075 B2 * | 9/2003 | Hirose et al. | 82/118 |
| 6,640,678 B2 * | 11/2003 | Kumano | 82/129 |
| 6,948,411 B2 * | 9/2005 | Grossmann | 82/129 |
| 7,032,484 B2 * | 4/2006 | Kobayashi et al. | 82/129 |
| 7,219,407 B2 * | 5/2007 | Schneider et al. | 29/27 C |
| 7,240,412 B2 * | 7/2007 | Sasazawa et al. | 29/27 C |

FOREIGN PATENT DOCUMENTS

| | | |
|---|---|---|
| JP | 10-15702 | 1/1998 |
| JP | 11-510439 | 9/1999 |
| WO | WO-01/30522 | 5/2001 |

* cited by examiner

Prior Art

FIG. 8

Prior Art

NC AUTOMATIC LATHE

TECHNICAL FIELD

The present invention relates to an NC automatic lathe, and more particularly, to the NC automatic lathe in which a number of back machining tools can be attached to a fixed back machining tool unit, without increasing dimensions of an apparatus in directions of depth and height, whereby more complicated and diversified back machining can be conducted, and consequently, a machining time can be reduced.

BACKGROUND ART

As a disclosure of the NC automatic lathe of this type, there is Patent Document 1, for example. For information, Patent Document 1 belongs to the applicant of this patent application.

Patent Document 1: JP-A-10-015702

Figure 7:
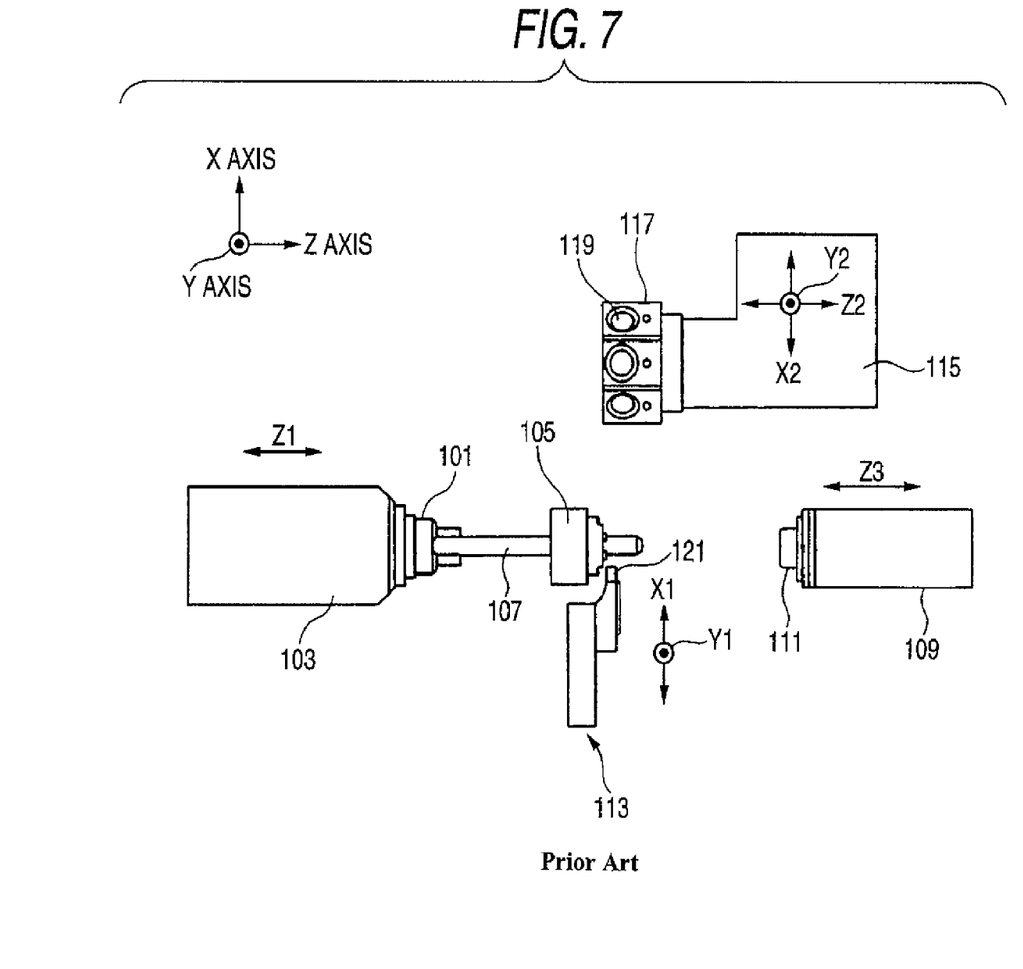
FIG. 7 is a plan view schematically showing an entire configuration of an NC automatic lathe, which is a view showing the prior art.

The NC automatic lathe having such a configuration as shown in FIG. 7 is disclosed in the above mentioned Patent Document 1. In the first place, there is arranged a headstock 103 provided with a main spindle 101. This headstock 103 is so configured as to move in a direction of Z1 axis which is parallel to an axial direction of the main spindle. A guide bush 105 is arranged in front of the main spindle 101, and holds a tip end portion of a work 107 which is holded by the main spindle 101.

A back attachment 109 is arranged so as to be opposed to the main spindle 103. This back attachment 109 is provided with a sub spindle 111, and is so configured as to move in a direction of Z3 axis which is parallel to the axial direction of the main spindle 101. A gang tool post 113 is arranged at a side of the guide bush 105, and is so configured as to move in both directions of X1 axis and Y1 axis which are perpendicular to the axial direction of the main spindle 101 and also perpendicular to each other.

A turret tool post 115 is arranged at another side of the guide bush 105, opposite to the gang tool post 113. This turret tool post 115 is provided with a turret 117, and is so configured as to move in a direction of Z2 axis which is parallel to the axial direction of the main spindle 101, and in both directions of X2 axis and Y2 axis which are perpendicular to the direction of the Z2 axis and also perpendicular to each other.

The turret 117 is provided with a plurality of tool holder attaching parts 119, and tool holders which hold tools (not shown) will be detachably attached to the tool holder attaching parts 119. Moreover, a plurality of tools 121 are attached to the gang tool post 113.

According to the above described configuration, front machining is conducted on the work 107 which is holded by the main spindle 101, by means of the tools 121 of the gang tool post 113 and the tools (not shown) attached to the turret tool post 115. After the front machining has been finished, cutting-off work is conducted, and then, back machining is conducted on the work 107 which is holded by the sub spindle 111, by means of the turret tool post 115.

In case of the NC automatic lathe having the above described configuration, the back machining on the work 107 has been conducted only by the turret tool post 115 which has been also concerned with the front machining. Accordingly, there has been such a problem that the turret tool post 115 must cover a larger number of machining processes as compared with the gang tool post 113 which is concerned with only the front machining, and it would be impossible to properly distribute the machining processes between the front face and back face thereby to reduce a machining time. Moreover, there has been a problem that because the turret tool post 115 need to be provided with the tools for both the front machining and the back machining, and there is a shortage of tools in number, for conducting complicated and diversified machining. Further, for simultaneously conducting both primary machining and secondary machining, the turret tool post 115 can be concerned with the front machining only with the limited tools, and so, the front machining is conducted only by the gang tool post. In this case, complicated machining cannot be applied even to the front machining, and it would be impossible to reduce the machining time, by simultaneously machining, using the two tool rests.

Figure 8:
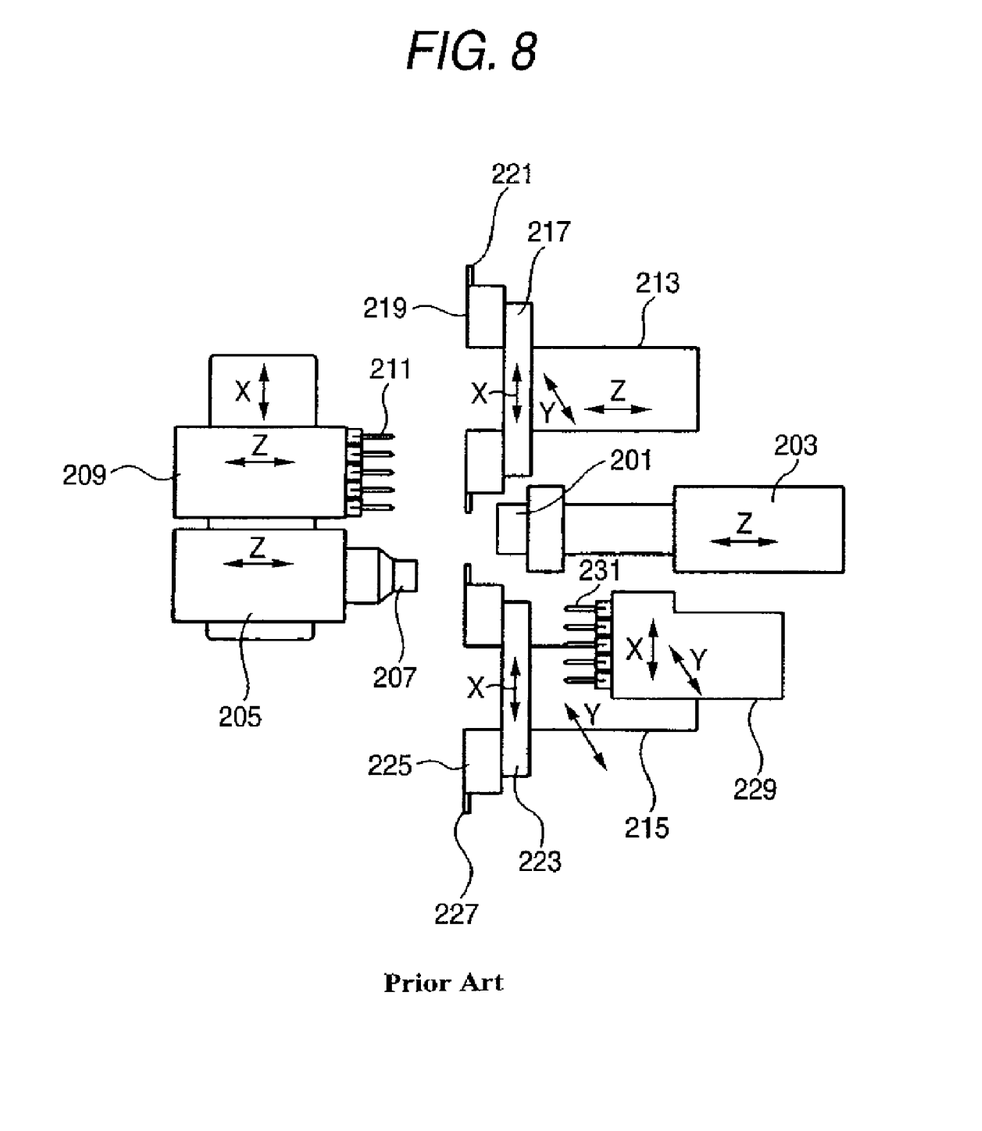
FIG. 8 is a plan view schematically showing an entire configuration of another NC automatic lathe, which is a view showing the prior art.

Under the circumstances, an NC automatic lathe having such a configuration as shown in FIG. 8 has been proposed. This is the configuration of the NC automatic lathe of "TNL-26" model, manufactured by Traube GmbH, in Germany.

In the first place, there is arranged a headstock 203 provided with a main spindle 201. This headstock 203 is so configured as to move in a direction of Z axis which is parallel to an axial direction of the main spindle 201. A back attachment 205 is arranged so as to be opposed to the headstock 203. This back attachment 205 is provided with a sub spindle 207, and is so configured as to move in the direction of the Z axis.

A front machining tool unit 209 is arranged at a side of the back attachment 205. This front machining tool unit 209 is provided with a plurality of front machining tools 211, and is so configured as to move in the direction of the Z axis. Moreover, both the back attachment 205 and the front machining tool unit 209 are so configured as to move also in the direction of X axis.

A turret tool post 213 and a turret tool post 215 are arranged at both sides of the main spindle 201. The turret tool post 213 is provided with a turret 217, and is so configured as to move in directions of the X axis, Y axis and Z axis. A plurality of tool holders 219 are detachably attached to the turret 217, and tools 221 are attached to the tool holders.

The turret tool post 215 is provided with a turret 223, and is so configured as to move in directions of the X axis and Y axis. A plurality of tool holders 225 are detachably attached to the turret 223, and tools 227 are attached to the tool holders.

Moreover, a back machining tool unit 229 is arranged at a side of the main spindle 201. A plurality of back machining tools 231 are attached to this back machining tool unit 229. The back machining tool unit 229 is so configured as to move in the directions of the X axis and Y axis.

According to the NC automatic lathe having the above described configuration, because there are provided the turret tool post 213 and the turret tool post 215, and additionally, the front machining tool unit 209 is provided, the three tool rests will be simultaneously concerned with the front machining, even though both primary and secondary machining are simultaneously conducted. Accordingly, it is possible to rapidly perform complicated machining on the front face. Further, the back machining is conducted by the back machining tools 231 attached to the back machining tool unit 229 and the back machining tools attached to the turrets 217, 223. As compared with the NC automatic lathes as shown in FIG. 7, the back machining is conducted by the back machining tools 231 attached to the back machining tool unit 229 independently from the front machining, whereby the machining time can be reduced.

DISCLOSURE OF THE INVENTION

Problems that the Invention is to Solve

The above described conventional configuration has had the following problems;

It is also possible, with the above described NC automatic lathe of "TNL-26" model manufactured by Traube GmbH in Germany, to conduct the diversified back machining to some extent, while the complicated and diversified front machining is carried out. However, there has been a growing desire to distribute the machining processes which have been originally conducted at the front side, to the back side, by realizing the back machining similar to the complicated and diversified front machining, thereby to obtain compatibility between the complicated machining and the reduced machining time, when such machining is conducted. In order to conduct more complicated and diversified back machining while the complicated and diversified machining is carried out at the front side, it is necessary to increase the number of the back machining tools to be attached to the back machining tool unit 229. However, in case where the number of the back machining tools 231 has to be increased in the configuration of the NC automatic lathe of "TNL-26" model manufactured by Traube GmbH in Germany, there have been the following problems.

Specifically, in case of the NC automatic lathe as shown in FIG. 8, the turret tool post 213, the turret tool post 215, and the back machining tool unit 229 are arranged so as to surround the headstock 203 in such a manner that they are superposed on one another in both directions of depth and height of the apparatus. Moreover, the back machining tool unit 229 is disposed in such a space that its operation area in the directions of the X axis and Y axis may not interfere with respective operation areas of the turret tool post 213 and the turret tool post 215. For this reason, in case where it is desired to construct a machine which is compact in the direction of depth or in the direction of height, the number of the back machining tools 231 to be attached to the back machining tool unit 229 will be naturally limited, to such an extent that only five pieces or so can be arranged in the direction of the X axis, as shown in FIG. 8. If the number of the back machining tools 231 is desired to be increased, by increasing the number to be arranged in the direction of the X axis, the apparatus will be enlarged by the increased number, in the direction of depth or in the direction of height. On the other hand, if the number is desired to be increased, by increasing rows, the respective operation areas must be set so that the back machining tool unit 229 may not interfere with the operation areas of the turret tool post 213 and the turret tool post 215. Accordingly, it has been necessary to arrange the back machining tool unit 229 separately from the turret tool post 213 and the turret tool post 215 to a large extent, in the direction of depth or in the direction of height, or in both the directions. Consequently, if the number of the tools is desired to be increased, the apparatus will be large-sized in the direction of depth or in the direction of height, and it has been impossible, with the configuration of the NC automatic lathe as shown in FIG. 8, to realize complicated and diversified machining by increasing the number of the back machining tools 231, and at the same time, to reduce the machining time, while dimensions of the apparatus in the direction of depth or in the direction of height are reduced.

There has been another problem, with the NC automatic lath as shown in FIG. 8, that the turret tool post 213, the turret tool post 215, and the back machining tool unit 229 are superposed on one another in the direction of depth or in the direction of height, and therefore, workability has been poor on occasion of maintenance and inspection.

The invention has been made in view of such problems, and an object of the invention is to provide an NC automatic lathe in which a number of tools can be attached to a fixed back machining tool unit, without increasing dimensions of an apparatus in both directions of depth and height, whereby more complicated and diversified back machining can be conducted, and a machining time can be reduced.

MEANS FOR SOLVING THE PROBLEMS

In order to attain the above described object, an NC automatic lathe according to claim 1 of the invention of this application is configured by including: a base board; a headstock that is mounted on the base board and provided with a main spindle, the headstock being arranged to move in a direction of a Z1 axis that is parallel to an axial direction of the main spindle; a back attachment that is mounted on the base board and provided with a subspindle that is arranged to be opposed to the headstock, the back attachment being arranged to move in a direction of a Z2 axis that is parallel to the axial direction of the main spindle, and in both directions of an X2 axis and a Y2 axis that are perpendicular to the direction of the Z2 axis and are perpendicular to each other; a guide bush that is mounted on the base board between the headstock and the back attachment; a first turret tool post that is mounted on the base board and arranged at a side of the guide bush to move in both directions of an X1 axis and a Y1 axis that are perpendicular to the axial direction of the main spindle and are perpendicular to each other; a second turret tool post that is mounted on the base board and arranged at a side of the guide bush to move in a direction of a Z3 axis that is parallel to the axial direction of the main spindle, and in both directions of an X3 axis and a Y3 axis that are perpendicular to the direction of the Z3 axis and are perpendicular to each other; and a fixed back machining tool unit that is mounted on the base board and arranged at a position offset with respect to at least one of the first turret tool post and the second turret tool post, to the back attachment in a direction of a Z axis that is parallel to the axial direction of the main spindle, the fixed back machining tool unit being provided with tool holding portions in at least two rows and two lines in both directions of an X axis and a Y axis that are perpendicular to the direction of the Z axis and are perpendicular to each other.

Moreover, an NC automatic lathe according to claim 2 is the NC automatic lathe as claimed in claim 1 characterized in that the second turret tool post is configured that a back machining tool is attachable thereto.

Further, an NC automatic lathe according to claim 3 is the NC automatic lathe as claimed in claim 1 or 2 characterized in that the second turret tool post and the back machining headstock can be operated by superposition control in at least two directions out of the directions of the X axis, Y axis and Z axis.

ADVANTAGES OF THE INVENTION

According to the NC automatic lathe of the invention, the following advantages can be obtained.

Due to the configuration that the fixed back machining tool unit is arranged at the position offset, in the direction of the Z axis, with respect to the first turret tool post and the second turret tool post, and the subspindle can be controlled to move in the three directions of the X axis, Y axis and Z axis, it will be possible to arrange the back machining tools in a plurality of rows. Because the many back machining tools are held, it will be possible to conduct more complicated and diversified back machining independently from the front machining. Accordingly, it will be possible to properly distribute the machining processes to the front face and the back face, thereby to reduce the machining time.

Moreover, on this occasion, the fixed back machining tool unit need not be separated from the first turret tool post and the second turret tool post in a direction perpendicular to the direction of the Z axis, that is, in the direction of depth or in the direction of height of the apparatus, for the purpose of preventing interference with machining areas of the tools of various kinds attached to the first turret tool post and the second turret tool post. Accordingly, it is possible to provide the automatic lathe which has small sizes in the directions of depth and height of the apparatus.

Consequently, the headstock, the back attachment, the first turret tool post, the second turret tool post, and the fixed back machining tool unit can be arranged flatly, without superposing them in the direction of depth or in the direction of height of the apparatus. Accordingly, the configuration of the apparatus will be simplified, and at the same time, maintenance and inspection works will be performed easily.

Moreover, in case where the back machining tools can be also attached to the second turret tool post, it is possible to conduct more diversified and complicated back machining in a short machining time.

Due to the configuration that the back machining tools can be held not only by the fixed back machining tool unit but also by the second turret tool post, much more diversified and complicated back machining can be dealt with.

Further, when the second turret tool post has been indexed at the determined position in the direction of the X3 axis, the back attachment can select either of the tools arranged in the direction of the X2 axis or in the direction of the Y2 axis which have been set for the back machining, using its controlling function of the axes in the directions of the X2 axis or Y2 axis. In this manner, an effective use of the back attachment can be achieved, and the machining time can be reduced.

BEST MODE FOR CARRYING OUT THE INVENTION

Figure 1:
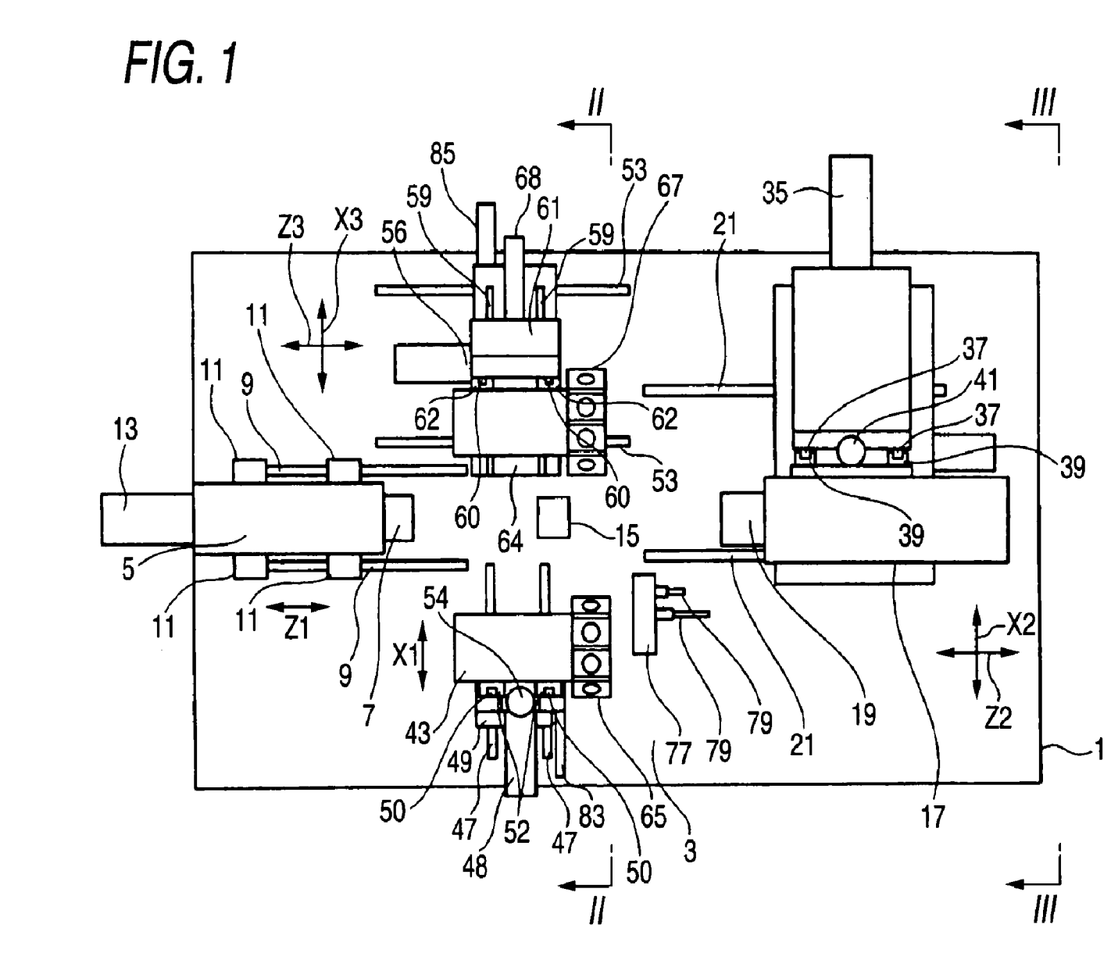
FIG. 1 is a plan view showing an entire configuration of an NC automatic lathe, which is a view showing an embodiment of the invention.
Figure 2:
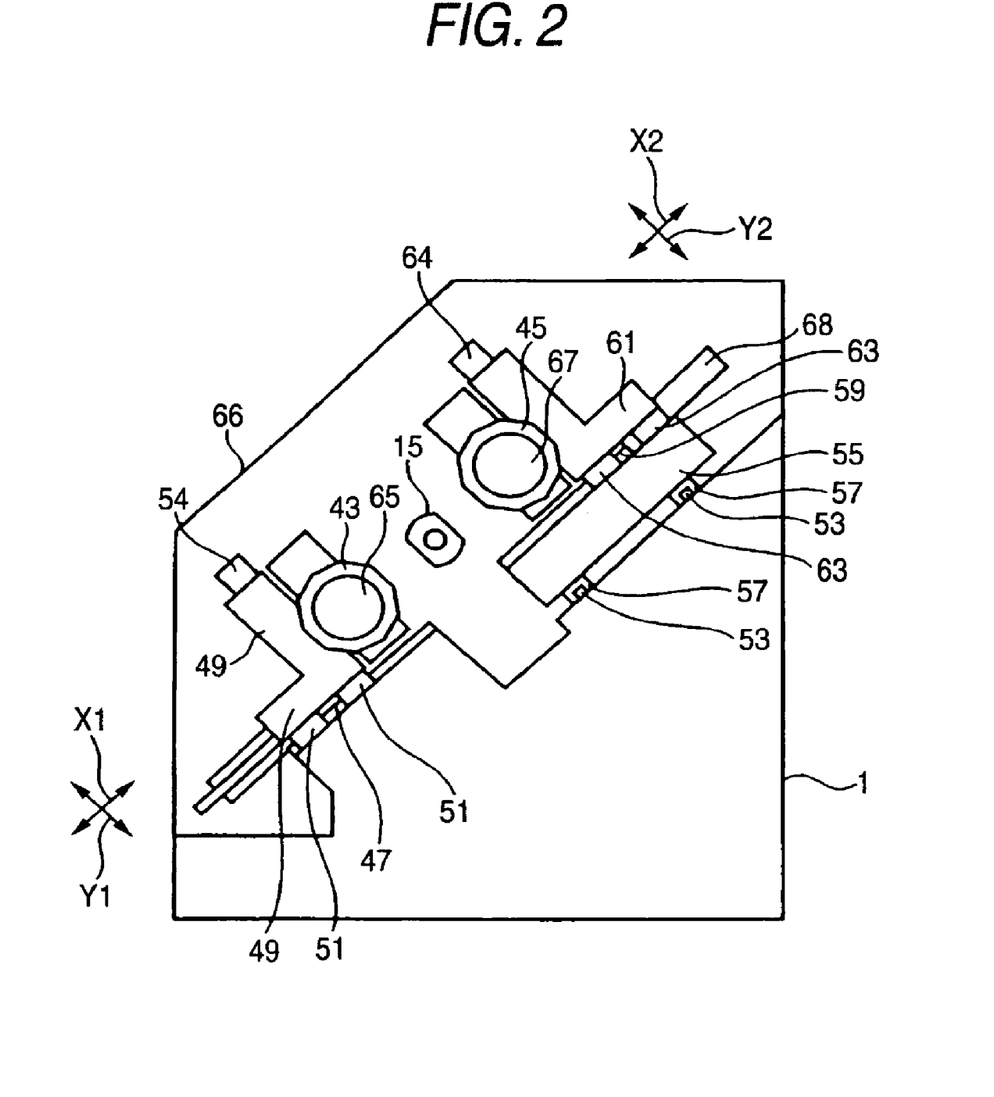
FIG. 2 is a sectional view taken along a line II-II in FIG. 1, which is a view showing the embodiment of the invention.
Figure 3:
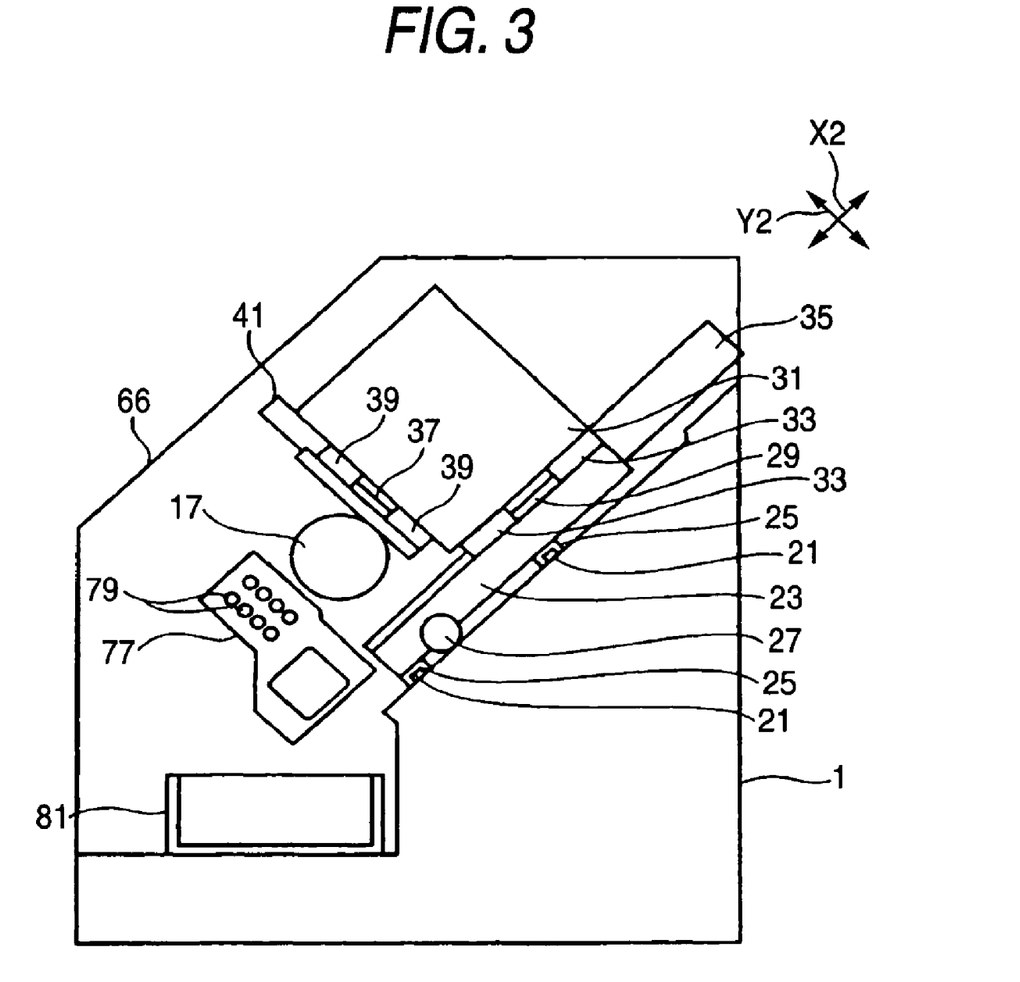
FIG. 3 is a sectional view taken along a line III-III in FIG. 1, which is a view showing the embodiment of the invention.

Now, an embodiment of the invention will be described referring to FIGS. 1 to 6. FIG. 1 is a plan view showing an entire configuration of an NC automatic lathe in the embodiment, FIG. 2 is a sectional view taken along a line II-II in FIG. 1, and FIG. 3 is a sectional view taken along a line III-III in FIG. 1. There is a base board 1, and a table 3 is provided on the base board 1. The table 3 is provided in an inclined manner, as shown in FIGS. 2 and 3.

For information, an angle of inclination is 45° in this embodiment.

A headstock 5 is mounted on the table 3, at a left side in FIG. 1. This headstock 5 is provided with a main spindle 7 at a forward end thereof (a right end in FIG. 1) in a rotatable manner, and the main spindle 7 is adapted to hold a work (not shown). The headstock 5 is so configured as to move in a direction of Z1 axis which is parallel to an axial direction of the main spindle 7.

A NC automatic lathe according one or more embodiments of the invention comprises: a base board; a headstock that is mounted on the base board and provided with a main spindle, the headstock being arranged to move in a direction of a Z1 axis that is parallel to an axial direction of the main spindle; a back attachment that is mounted on the base board and provided with a subspindle that is arranged to be opposed to the headstock, the back attachment being arranged to move in a direction of a Z2 axis that is parallel to the axial direction of the main spindle, and in both directions of an X2 axis and a Y2 axis that are perpendicular to the direction of the Z2 axis and are perpendicular to each other; a guide bush that is mounted on the base board between the headstock and the back attachment; a first turret tool post that is mounted on the base board and arranged at a side of the guide bush to move in both directions of an Xl axis and a Yl axis that are perpendicular to the axial direction of the main spindle and are perpendicular to each other; a second turret tool post that is mounted on the base board and arranged at a side of the guide bush to move in a direction of a Z3 axis that is parallel to the axial direction of the main spindle, and in both directions of an X3 axis and a Y3 axis that are perpendicular to the direction of the Z3 axis and are perpendicular to each other; and a fixed back machining tool unit that is mounted on the base board and arranged at a position offset with respect to at least one of the first turret tool post and the second turret tool post, to the back attachment in a direction of a Z axis that is parallel to the axial direction of the main spindle, the fixed back machining tool unit being provided with tool holding portions in at least two rows and two lines in both directions of an X axis and a Y axis that are perpendicular to the direction of the Z axis and are perpendicular to each other.

In a NC automatic lathe according one or more embodiments of the present invention, the second turret tool post is configured such that a back machining tool is attachable thereto.

In a NC automatic lathe according to one or more embodiments of the present invention, the second turret tool post and the back machining headstock can be operated by superposition control in at least two directions out of the directions of the X axis, Y axis and Z axis.

Specifically, guide rails 21, 21 in the direction of the Z2 axis are provided on the table 3, as shown in FIGS. 1 and 3. A first base member 23 is provided on the guide rails 21, 21 in the direction of the Z2 axis, and two pairs of the guide members 25, 25, 25, 25 in the direction of the Z2 axis are respectively attached to a lower face of this first base member 23. These guide members 25, 25, 25, 25 in the direction of the Z2 axis are movably engaged with the guide rails 21, 21 in the direction of the Z2 axis. Moreover, there is provided a servomotor 27, and a ball spring (not shown) is connected to a rotation shaft of this servomotor 27. The ball spring is spirally provided with a ball nut (not shown), and the ball nut is fixed to the first base member 23. Accordingly, by rotating the servomotor 27 in an appropriate direction, the first base member 23 will move in the direction of the Z2 axis by way of the ball spring and the ball nut.

As shown in FIG. 3, guide rails 29, 29 in the direction of the X2 axis are provided on the first base member 23. A second base member 31 is provided on the guide rails 29, 29 in the direction of the X2 axis, and two pairs of the guide members 33, 33, 33, 33 in the direction of the X2 axis are respectively attached to a lower face of this second base member 31. These guide members 33, 33, 33, 33 in the direction of the X2 axis are movably engaged with the guide rails 29, 29 in the direction of the X2 axis. Moreover, there is provided a servomotor 35, and a ball spring (not shown) is connected to a rotation shaft of this servomotor 35. The ball spring is spirally provided with a ball nut (not shown), and the ball nut is fixed to the second base member 31. Accordingly, by rotating the servomotor 35 in an appropriate direction, the second base member 31 will move in the direction of the X2 axis by way of the ball spring and the ball nut.

Then, the back attachment 17 which has been already described is provided on the first base member 23. Specifically, guide rails 37, 37 in the direction of the Y2 axis are provided on the second base member 31, as shown in FIG. 3. On the other hand, the back attachment 17 is provided with two pairs of the guide members 39, 39, 39, 39 in the direction of the Y2 axis respectively at both sides thereof, and these guide members 39, 39, 39, 39 in the direction of the Y2 axis are movably engaged with the guide rails 37, 37 in the direction of the Y2 axis. Moreover, there is provided a servomotor 41, and a ball spring (not shown) is connected to a rotation shaft of this servomotor 41. The ball spring is spirally provided with a ball nut (not shown), and the ball nut is fixed to the back attachment 17. Accordingly, by rotating the servomotor 41 in an appropriate direction, the back attachment 17 will move in the direction of the Y2 axis by way of the ball spring and the ball nut.

According to the above described configuration, the back attachment 17 is adapted to move in the directions of the Z2 axis, X2 axis and Y2 axis.

As shown in FIGS. 1 and 2, a first turret tool post 43 and a second turret tool post 45 are disposed surrounding the guide bush 15, in a manner opposed to each other. The first turret tool post 43 is so configured as to move in directions of X1 axis and Y1 axis which are perpendicular to the axial direction of the main spindle 7 and also perpendicular to each other.

Specifically, as shown in FIGS. 1 and 2, guide rails 47, 47 in the direction of the X1 axis are provided on the table 3. A base member 49 is provided above the guide rails 47, 47 in the direction of the X1 axis, and two pairs of the guide members 51, 51, 51, 51 in the direction of the X1 axis are respectively provided on a lower face of this base member 49. These four guide members 51, 51, 51, 51 in the direction of the X1 axis are movably engaged with a pair of the guide rails 47, 47 in the direction of the X1 axis. Moreover, there is provided a servomotor 48, and a ball spring (not shown) is connected to a rotation shaft of this servomotor 48. The ball spring is spirally provided with a ball nut (not shown), and the ball nut is fixed to the base member 49. Accordingly, by rotating the servomotor 48 in an appropriate direction, the base member 49 will move in the direction of the X1 axis by way of the ball spring and the ball nut.

Then, the first turret tool post 43 which has been already described is provided on the base member 49 so as to move in a direction of the Y1 axis. Specifically, guide rails 50, 50 in the direction of the Y1 axis are provided on the base member 49, as shown in FIG. 1. On the other hand, the first turret tool post 43 is provided with guide members 52, 52 in the direction of the Y1 axis, and these guide members 52, 52 are movably engaged with the guide rails 50, 50 in the direction of the Y1 axis. Moreover, there is provided a servomotor 54, and a ball spring (not shown) is connected to a rotation shaft of this servomotor 54. The ball spring is spirally provided with a ball nut (not shown), and this ball nut is fixed to the first turret tool post 43. Accordingly, by rotating the servomotor 54 in an appropriate direction, the first turret tool post 43 will move in the direction of the Y1 axis by way of the ball spring and the ball nut.

Then, the second turret tool post 45 will be described. This second turret tool post 45 is so adapted as to move in a direction of Z3 axis which is parallel to the axial direction of the main spindle 7, and in directions of X3 axis, and Y3 axis which are perpendicular to the direction of the Z3 axis and also perpendicular to each other.

Specifically, as shown in FIGS. 1 and 2, guide rails 53, 53 in the direction of the Z3 axis are provided on the table 3. A first base member 55 is provided above the guide rails 53, 53 in the direction of the Z3 axis, and two pairs of the guide members 57, 57, 57, 57 in the direction of the Z3 axis are respectively provided on a lower face of this first base member 55. These four guide members 57, 57, 57, 57 in the direction of the Z3 axis are movably engaged with a pair of the guide rails 53, 53 in the direction of the Z3 axis. Moreover, there is provided a servomotor 56, and a ball spring (not shown) is connected to a rotation shaft of this servomotor 56. The ball spring is spirally provided with a ball nut (not shown), and the ball nut is fixed to the first base member 55. Accordingly, by rotating the servomotor 56 in an appropriate direction, the first base member 55 will move in the direction of the Z3 axis by way of the ball spring and the ball nut.

Moreover, a pair of guide rails 59, 59 in the direction of the X3 axis are provided on the first base member 55. A second base member 61 is provided above the guide rails 59, 59 in the direction of the X3 axis, and two pairs of the guide members 63, 63, 63, 63 in the direction of the X3 axis are respectively provided on a lower face of this second base member 61. These four guide members 63, 63, 63, 63 in the direction of the X3 axis are movably engaged with a pair of the guide rails 59, 59 in the direction of the X3 axis. Moreover, there is provided a servomotor 68, and a ball spring (not shown) is connected to a rotation shaft of this servomotor 68. The ball spring is spirally provided with a ball nut (not shown), and the ball nut is fixed to the second base member 61. Accordingly, by rotating the servomotor 68 in an appropriate direction, the second base member 61 will move in the direction of the X3 axis by way of the ball spring and the ball nut.

Then, the second turret tool post 45 which has been already described is provided on the second base member 61 so as to move in a direction of the Y3 axis. Specifically, guide rails 60, 60 in the direction of the Y3 axis are provided on the second base member 61, as shown in FIG. 1. On the other hand, the second turret tool post 45 is provided with guide members 62, 62 in the direction of the Y3 axis, and these guide members 62, 62 are movably engaged with the guide rails 60, 60 in the direction of the Y3 axis. Moreover, there is provided a servomotor 64, and a ball spring (not shown) is connected to a rotation shaft of this servomotor 64. The ball spring is spirally provided with a ball nut (not shown), and this ball nut is fixed to the second turret tool post 45. Accordingly, by rotating the servomotor 64 in an appropriate direction, the second turret tool post 45 will move in the direction of the Y3 axis by way of the ball spring and the ball nut.

The first turret tool post 43 is provided with a first turret 65, and a plurality of tool holder attaching parts are provided in a circumferential part of the first turret 65. Tool holders which hold desired tools will be detachably attached to these tool holder attaching parts.

Moreover, the second turret tool post 45 is provided with a second turret 67, and a plurality of tool holder attaching parts are provided in a circumferential part of the second turret 67. Tool holders which hold desired tools will be detachably attached to these tool holder attaching parts.

Figure 4:
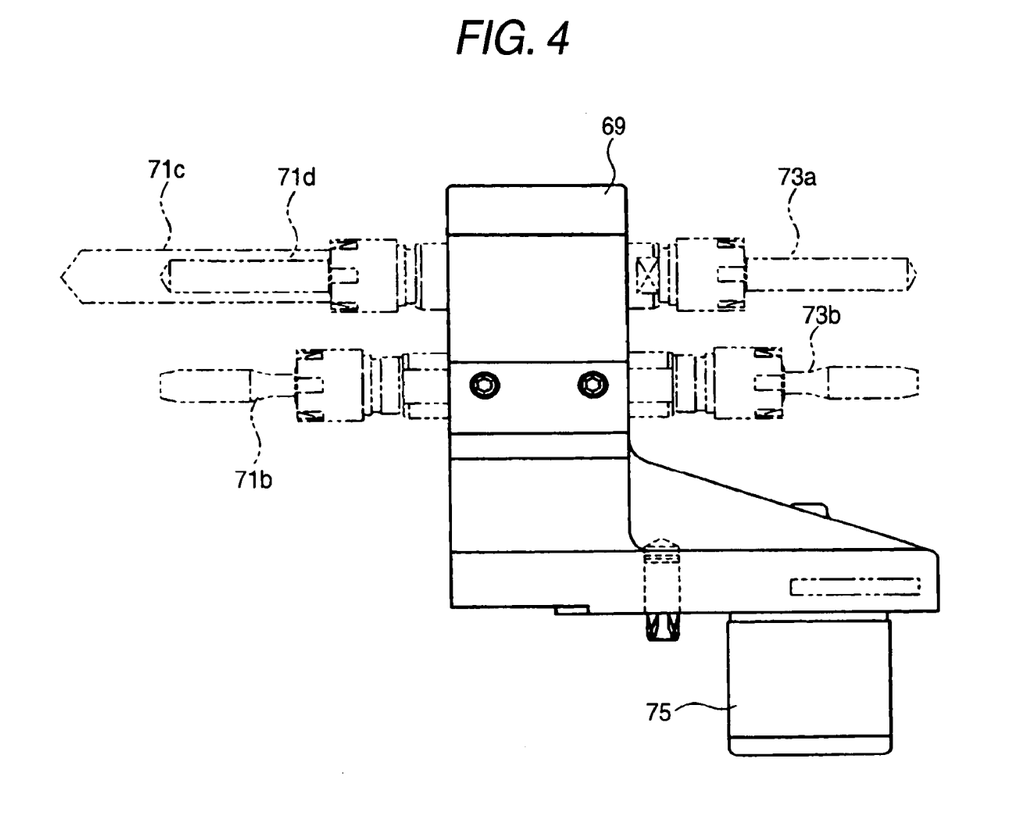
FIG. 4 is a view showing a configuration of a tool holder to be attached to a second turret tool post, which is a view showing the embodiment of the invention.

The second turret tool post 45 is so configured that both front machining tools and back machining tools can be attached thereto. Specifically, as shown in FIG. 4, there is a tool holder 69, which is so configured that both front machining tools 73 and back machining tools 71 can be attached thereto. The tool holder 69 has an insertion part 75 to be inserted and fixed into the tool holder attaching part of the second turret 67. There is provided, at a side of the insertion part 75, a rotation preventing stopper for preventing the tool holder 69 from rotating around the insertion part 75, when the tool holder 69 is attached to a attaching face of the second turret 67.

As the front machining tool 73, two front machining tools 73a and 73b juxtaposed in the direction of the X3 axis can be held by the tool holder 69. These tools will be used as the front machining tools, by axially controlling the second turret tool post 45 in the direction of the X3 axis, when the tool holder 69 has been indexed to an index rotating position of the turret. As the back machining tool 71, back machining tools 71c juxtaposed in the direction of the Y3 axis, with respect to back machining tools 71a and 71b juxtaposed in the direction of the X3 axis, can be held by the tool holder 69. The back attachment 17 will be axially controlled in the directions of the X2 axis, Y2 axis and Z2 axis so that the work held by the sub spindle 19 can be machined by the back machining tools 71a, 71b or 71c, in such a manner that machining work can be conducted by the tools designated to be used in the back attachment 17, when the tool holder 69 has been indexed to an index rotating position of the turret (in a state where the second turret tool post 45 has been controlled to move to a desired position in the directions of the X3 axis and Y3 axis to rest in that position). In this manner, even while the second turret tool post 45 rests still in a state to be used for the front machining, the back attachment 17 will be moved in the directions of the X2 axis, Y2 axis, and Z2 axis, and finally, the back machining tools 71a, 71b, 71c will be selectively positioned with respect to the sub spindle 19, thereby to conduct the back machining simultaneously. It has become possible to install a plurality of the back machining tools in the directions of the X3 axis and Y3 axis, particularly in the direction of the Y3 axis, in this manner, although it has been conventionally impossible, and it has become possible to increase the number of the tools which can serve for the back machining.

In order that the second turret 67 provided with the front machining tool 73 and the back machining tool 71 can be effectively operative with respect to the work held by the headstock 5 and the work held by the back attachment 17, super position control of the three members, namely the headstock 5, the back attachment 17, and the second turret tool post 45 has been made possible, in the machine tool in this embodiment.

As a numerical control device to be provided on the machine tool in this embodiment, a numerical control device of three channel control is adopted, and the headstock 5 is controlled by an NC program described for channel 1. Moreover, the back attachment 17 is controlled by an NC program described for channel 2. Further, the second turret tool post 45 is controlled by an NC program described for channel 3.

When the superposition control between the three members is effected, as a first step, the numerical control device interprets an M code, which means the super position control, described in a determined description format in the NC program, whereby a process form of control pulses for controlling the control axes respectively controlled by the channels 1, 2 and 3 will be changed to a process form for the super position control. Supply of the control pulse to the control axis which is designated by the NC program described for each channel will be specifically changed by a firmware which is actuated at a time of change, as follows;

A case where super position of the Z1 axis, Z2 axis, and Z3 axis is designated by the NC program will be explained, as an example. To the servomotor for the Z1 axis (the headstock 5) which is controlled by the channel 1, a control pulse of a very amount designated by the NC program is supplied. Then, to the servomotor for the Z3 axis (the second turret tool post 45) which is controlled by the channel 3, the same servo pulse as supplied to the Z1 axis is added to the control pulse of the very amount designated by the NC program, and the total pulse is supplied to the servomotor as the control pulse for the Z3 axis, thereby to attain relative operation of the Z3 axis with respect to the Z1 axis. Further, to the servomotor for the Z2 axis (the back attachment 17) which is controlled by the channel 2, the servo pulse actually supplied to the servo motor for controlling the Z3 axis is added to the control pulse of the very amount designated by the NC program, and the total pulse is supplied to the servomotor as the control pulse for the Z2 axis, thereby to attain relative operation of the Z2 axis with respect to the Z3 axis.

Then, a case where superposition of the X3 axis and X2 axis is designated by the NC program will be explained, as an example. To the servomotor for the X3 axis (the second turret tool post 45) which is controlled by the channel 3, a control pulse of a very amount designated by the NC program is supplied. Then, to the servomotor for the X2 axis (the back attachment 17) which is controlled by the channel 2, the same servo pulse as supplied to the X3 axis is added to the control pulse of the very amount designated by the NC program, and the total pulse is supplied to the servomotor as the control pulse for the X2 axis, thereby to attain relative operation of the X2 axis with respect to the X3 axis.

Similarly, a case where superposition of the Y3 axis and Y2 axis is designated by the NC program will be explained, as an example. To the servomotor for the Y3 axis (the second turret tool post 45) which is controlled by the channel 3, a control pulse of a very amount designated by the NC program is supplied. Then, to the servomotor for the Y2 axis (the back attachment 17) which is controlled by the channel 2, the same servo pulse as supplied to the Y3 axis is added to the control pulse of the very amount designated by the NC program, and the total pulse is supplied to the servomotor as the control pulse for the Y2 axis, thereby to attain relative operation of the Y2 axis with respect to the Y3 axis.

In this manner, the superposition control of the Z axis between the second turret tool post 45 and the back attachment 17 with respect to the headstock 5, and the superposition control of the X axis, Y axis, and Z axis between the second turret tool post 45 and the back attachment 17 will be performed.

Figure 5:
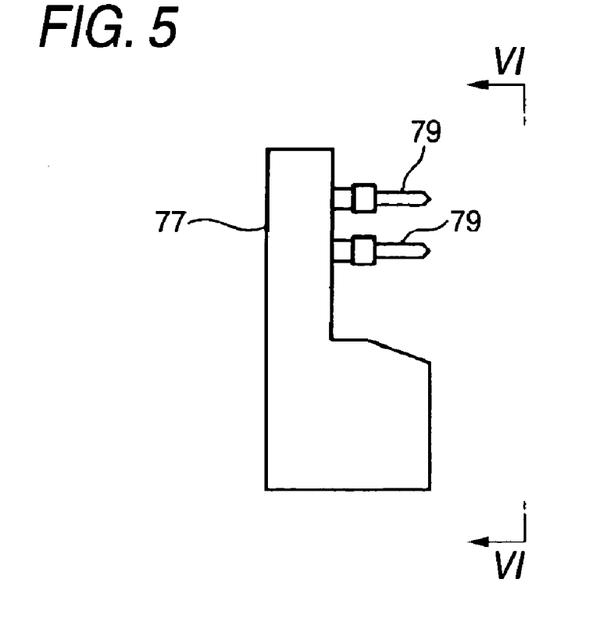
FIG. 5 is a plan view showing a configuration of a fixed back machining tool unit, which is a view showing the embodiment of the invention.
Figure 6:
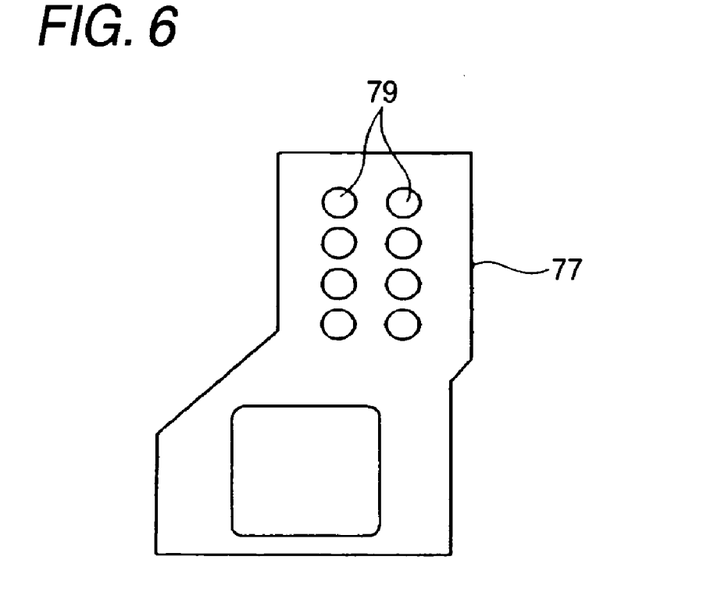
FIG. 6 is a view as seen in a direction of arrow marks VI-VI, which is a view showing the embodiment of the invention.

A fixed back machining tool unit 77 is mounted on the table 3, at a position offset to the back attachment 17 in the axial direction of the main spindle 7, with respect to the first turret tool post 43 and the second turret tool post 45. As shown in FIGS. 3, 5 and 6, back machining tools 79, in two rows in the direction of the X axis and four lines in the direction of the Y axis, eight in total, are detachably attached to the fixed back machining tool unit 77. In this embodiment, as described above, the fixed back machining tool unit 77 is arranged at the position offset to the back attachment 17 in the axial direction of the main spindle 7, with respect to the first turret tool post 43 and the second turret tool post 45, and accordingly, it is possible to increase the number of the back machining tools 79, without remarkably separating them to a large extent in the directions of depth or in the direction of height of the apparatus.

Moreover, a chip tank 81 is disposed directly below the fixed back machining tool unit 77, as shown in FIG. 3. Chips or the like which have fallen on the table 3 will be recovered into this chip tank 81. On this occasion, the fixed back machining tool unit 77 has a simple and compact configuration, because it is fixed in its literal sense, and is not particularly provided with a driving mechanism. Therefore, it is possible to prevent the chips or the like from being caught by the fixed back machining tool unit 77 to a maximum extent.

Denoted by numeral 66 in FIGS. 2 and 3 is a cover.

Operation of the above described configuration will be briefly explained.

Firstly, front machining on the work which is held by the main spindle 7 with its distal end held by the guide bush 15 will be conducted, by appropriately controlling the headstock 5 in the direction of the Z1 axis, the first turret tool post 43 in the directions of the X1 axis and Y1 axis, and the second turret tool post 45 in the directions of the Z3 axis, X3 axis and Y3 axis.

Moreover, back machining on the work held by the sub spindle 19 will be conducted, by appropriately controlling the back attachment 17 in the directions of the Z2 axis, X2 axis and Y2 axis, and the second turret tool post 45 in the directions of the Z3 axis, X3 axis and Y3 axes, and by appropriately using the fixed back machining tool unit 77. On this occasion, as for the back machining, more complicated and diversified machining has been made possible, because the back machining tools 79 attached to the fixed back machining tool unit 77 has been increased in number.

Further, because the fixed back machining tool unit 77 is provided at a side of the back attachment 17, the headstock 5, the back attachment 17, the first turret tool post 43, the second turret tool post 45, and the fixed back machining tool unit 77 can be arranged flatly, without superposing them in the direction of depth or in the direction of height of the apparatus. As the results, an outer package of the machine tool which is provided with such many tools for the front face and back machining can be made similar to an ordinary machine tool, as shown in FIG. 2, and accessibility to the second turret tool post 45 can be secured to the same extent as in the ordinary machine tool.

According to the above described embodiment, the following advantages can be obtained;

In the first place, because the second turret tool post 45 and the back attachment 17 are made controllable in the directions of the X3 axis, Y3 axis and Z3 axis, it will be possible to conduct the superposition control wherein the second turret tool post 45 is used also for the back machining, while the second turret tool post 45 is used for the front machining.

Due to the configuration that the fixed back machining tool unit 77 is arranged at the position offset to the back attachment 17 in the direction of the Z axis, with respect to the first turret tool post 43 and the second turret tool post 45, and the sub spindle 19 can be controlled to move in the three directions of the X2 axis, Y2 axis and Z2 axis, it will be possible to arrange the back machining tools 79 in a plurality of rows. Due to the configuration that the many back machining tools 79 are held by the fixed back machining tool unit 77, it will be possible to conduct more complicated and diversified back machining independently from the front machining. Accordingly, it will be possible to properly distribute the machining processes to the front face and the back face, thereby to reduce the machining time.

On this occasion, the fixed back machining tool unit 77 need not be separated from the first turret tool post 43 and the second turret tool post 45, to a large extent, in the direction perpendicular to the direction of the Z axis, that is, in the direction of depth or in the direction of height of the apparatus, for the purpose of preventing interference with machining areas of the tools attached to the first turret tool post 43 and the second turret tool post 45. Accordingly, it is possible to provide the automatic lathe which has small sizes in the directions of depth and height of the apparatus.

Usually, the NC automatic lathes of this type are installed in a plurality of rows in the direction of depth, and therefore, it is significant that the size of the apparatus in the direction of depth can be reduced.

Moreover, in this embodiment, the fixed back machining tool unit 77 is not arranged at a side of the second turret tool post 45 which has control axes in the directions of the X3 axis, Y3 axis and Z3 axis, but arranged at a side of the first turret tool post 43 which has control axes only in the directions of the X1 axis and Y1 axis. Accordingly, the entire machine will be free from such anxiety as becoming large-sized in the direction of the Z axis or in the direction of depth, which may be concerned in case where the fixed back machining tool unit 77 is arranged at a side of the second turret tool post 45.

Due to the configuration that the headstock 5, the back attachment 17, the first turret tool post 43, the second turret tool post 45, and the fixed back machining tool unit 77 can be arranged flatly, without superposing them in the direction of depth or in the direction of height of the apparatus, the configuration of the apparatus will be simplified, and at the same time, maintenance and inspection operation will be easily performed. Moreover, due to the configuration that the base board 1 is inclined, the fixed back machining tool unit 77 which is simple and compact having no driving mechanism is arranged at a lower position in the direction of inclination, and a chip tank 81 is disposed directly below them, it is possible to efficiently drop and recover chips.

In case of conducting the superposition controls in at least two directions out of the three directions of the X3 axis, Y3 axis, and Z3 axis between the back attachment 17 and the second turret tool post 45, the front machining is conducted by the tools 71, 73 held by the second turret tool post 45, by controlling the second turret tool post 45 in the directions of the X3 axis, Y3 axis and Z3 axis, and meanwhile, the work held by the back attachment is simultaneously machined by using the back machining tools which are provided on the second turret tool post. In this manner, it will be possible to conduct simultaneous machining without taking useless time for waiting, to set the tools for conducting the complicated and diversified machining on the back side without installing a tool rest exclusively for the back attachment, and to conduct the complicated machining to the same extent as the front machining with the tools of various kinds which are set on the fixed back machining tool unit. Because the machining capacity has been further enhanced in this manner, the machining processes which have been conventionally allotted to the front face can be set as the processes on the back face. As the results, it has become possible to use the back attachment more positively for machining, and on the other hand, it has become possible to reduce the machining time by efficiently using the front machining and the back machining.

Moreover, because the back machining tools can be held not only by the fixed back machining tool unit 77 but also by the second turret tool post 45, it is possible to deal with more diversified and complicated back machining.

Further, when the second turret tool post 45 has been indexed at the determined position in the direction of the X3 axis, the back attachment 17 can select either of the tools arranged in the direction of the X2 axis or in the direction of the Y2 axis which have been set for the back machining, using its axis controlling function in the directions of the X2 axis or Y2 axis. In this manner, an effective use of the back attachment 17 can be achieved, and the machining time can be reduced.

It is to be noted that the invention is not limited to the above described embodiment, but various modifications are considered.

INDUSTRIAL APPLICABILITY

The invention is to provide an NC automatic lathe in which a number of tools can be attached to a fixed back machining headstock, without increasing dimensions of the apparatus in directions of depth and height, whereby more complicated

DESCRIPTION OF THE REFERENCE NUMERALS AND SIGNS

1 Base board
3 Table
5 Headstock
7 Main spindle
9 Z1 axis guide rail
11 Z1 axis Guide member
17 back attachment
19 sub spindle
21 Z2 axis guide rail
23 First base member
25 Z2 axis guide member
29 X2 guide rail
31 Second base member
33 X2 axis guide member
37 Y2 axis guide rail
39 Y2 axis guide member
47 X1 axis guide rail
49 Base member
51 X1 axis guide member
53 Z3 axis guide rail
55 First base member
57 Z3 axis guide member
59 X3 axis guide rail
61 Second base member
63 X3 axis guide member
65 First turret
67 Second turret
69 Tool holder
71 Back machining tool
73 Front machining tool
77 Fixed back machining tool unit
79 Back machining tool

The invention claimed is:

1. An NC automatic lathe comprising:
a base board;
a headstock that is mounted on the base board and provided with a main spindle configured to hold a work piece, the headstock being arranged to move in a direction of a Z1 axis that is parallel to an axial direction of the main spindle;
a back attachment that is mounted on the base board and provided with a sub spindle that is arranged to be opposed to the headstock and configured to hold the work piece, the back attachment being arranged to move in a direction of a Z2 axis That is parallel to the axial direction of the main spindle, and in both directions of an X2 axis and a Y2 axis that are perpendicular to the direction of the Z2 axis and are perpendicular to each other;
a guide bush that is mounted on the base board between the headstock and the back attachment;
a first turret tool post that is mounted on the base board and arranged at a side of the guide bush to move in both directions of an X1 axis and a Y1 axis that are perpendicular to the axial direction of the main spindle and are perpendicular to each other;
a second turret tool post that is mounted on the base board and arranged at a side of the guide bush to move in a direction of a Z3 axis that is parallel to the axial direction of the main spindle, and in both directions of an X3 axis and a Y3 axis that are perpendicular to the direction of the Z3 axis and are perpendicular to each other; and
a fixed back machining tool unit tat is mounted on the base hoard and fixedly arranged at a position offset with respect to at least one of the first turret tool post and the second turret tool post, toward the back attachment in a direction of a Z axis that is parallel to the axial direction of the main spindle, the fixed back machining tool unit being provided with tool holding portions in at least two rows and two lines in both directions of an X axis and a Y axis that are perpendicular to the direction of the Z axis and are perpendicular to each other.

2. The NC automatic lathe according to claim 1, wherein the second turret tool post is configured such that a back machining tool is attachable thereto.

3. The NC automatic lathe according to claim 2, further comprising a tool holder that is attachable to a tool attaching face of the second turret tool post, the tool holder being attachable with at least two front face and at least two back face tools.

* * * * *